(12) United States Patent
El-Najjar et al.

(10) Patent No.: US 10,701,590 B2
(45) Date of Patent: Jun. 30, 2020

(54) SYSTEM AND METHOD FOR MINIMIZING NETWORK LOAD IMBALANCE AND LATENCY

(71) Applicant: TELEFONAKTIEBOLAGET LM ERICSSON (PUBL), Stockholm (SE)

(72) Inventors: Jad El-Najjar, Montreal (CA); Suliman Albasheir, Issaquah, WA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/585,868

(22) Filed: May 3, 2017

(65) Prior Publication Data

US 2017/0238211 A1 Aug. 17, 2017

Related U.S. Application Data

(63) Continuation of application No. 13/744,600, filed on Jan. 18, 2013, now abandoned.

(51) Int. Cl.
| | |
|---|---|
| H04W 28/08 | (2009.01) |
| H04L 12/24 | (2006.01) |
| H04W 24/02 | (2009.01) |
| H04L 12/26 | (2006.01) |
| H04W 24/08 | (2009.01) |
| H04W 40/24 | (2009.01) |
| H04W 16/18 | (2009.01) |
| H04W 84/04 | (2009.01) |

(52) U.S. Cl.
CPC .......... *H04W 28/08* (2013.01); *H04L 41/083* (2013.01); *H04L 41/12* (2013.01); *H04L 41/145* (2013.01); *H04L 43/08* (2013.01); *H04L 43/0882* (2013.01); *H04W 24/02* (2013.01); *H04W 24/08* (2013.01); *H04W 40/248* (2013.01); *H04L 43/0852* (2013.01); *H04L 43/0876* (2013.01); *H04W 16/18* (2013.01); *H04W 84/042* (2013.01)

(58) Field of Classification Search
CPC ...................................................... H04W 28/08
See application file for complete search history.

(56) References Cited

U.S. PATENT DOCUMENTS

| | | | | |
|---|---|---|---|---|
| 6,738,625 | B1* | 5/2004 | Oom | H04W 24/02 455/446 |
| 2005/0097161 | A1* | 5/2005 | Chiou | H04Q 3/0083 709/200 |
| 2011/0060710 | A1* | 3/2011 | Amin | G06F 15/16 706/13 |

* cited by examiner

*Primary Examiner* — Kevin M Cunningham
(74) *Attorney, Agent, or Firm* — Christopher & Weisberg, P.A.

(57) ABSTRACT

A system and method for improving a network topology to minimize load imbalance and latency between network nodes is provided. A network performance and configuration tool receives performance data from payload handling nodes, including radio stations, transport nodes and payload gateways to calculate a current network condition related to the current network topology. A revised network topology is determined by selecting a radio station to re-home from its parent transport node and payload gateway to a newly selected transport node and payload gateway. The revised network condition is calculated and compared to current network condition to determine if the re-homing should be accepted. The process can be repeated for a number of iterations until an optimized network topology is found. Configuration instructions are then transmitted to any radio stations that have been re-homed in the final network topology.

20 Claims, 14 Drawing Sheets

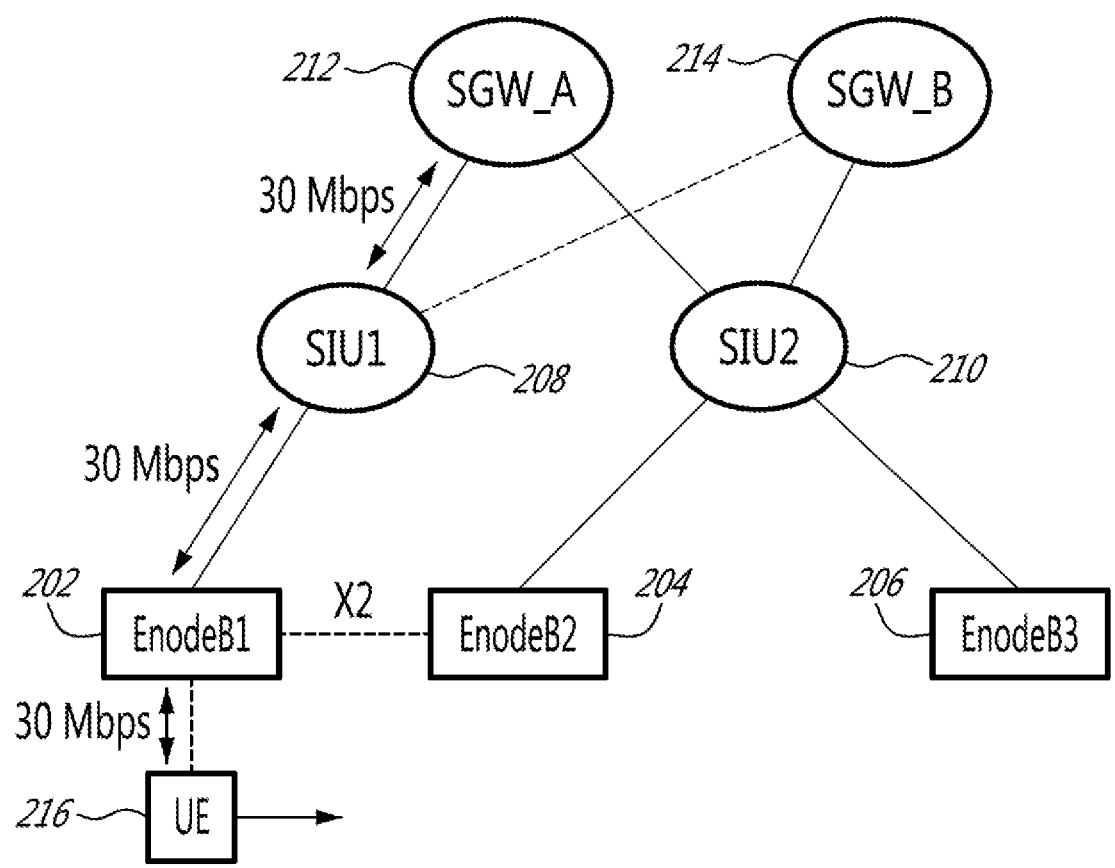

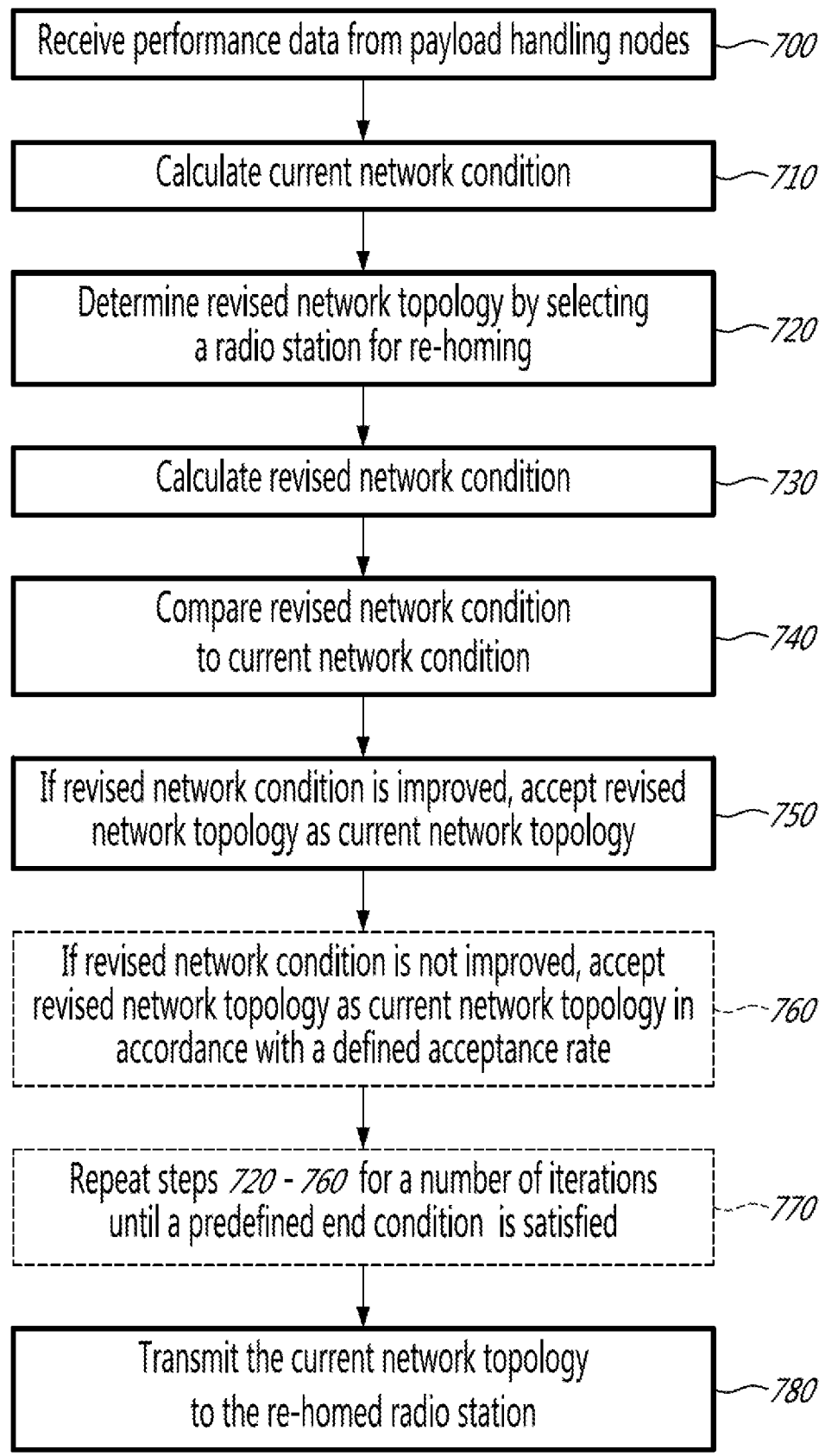

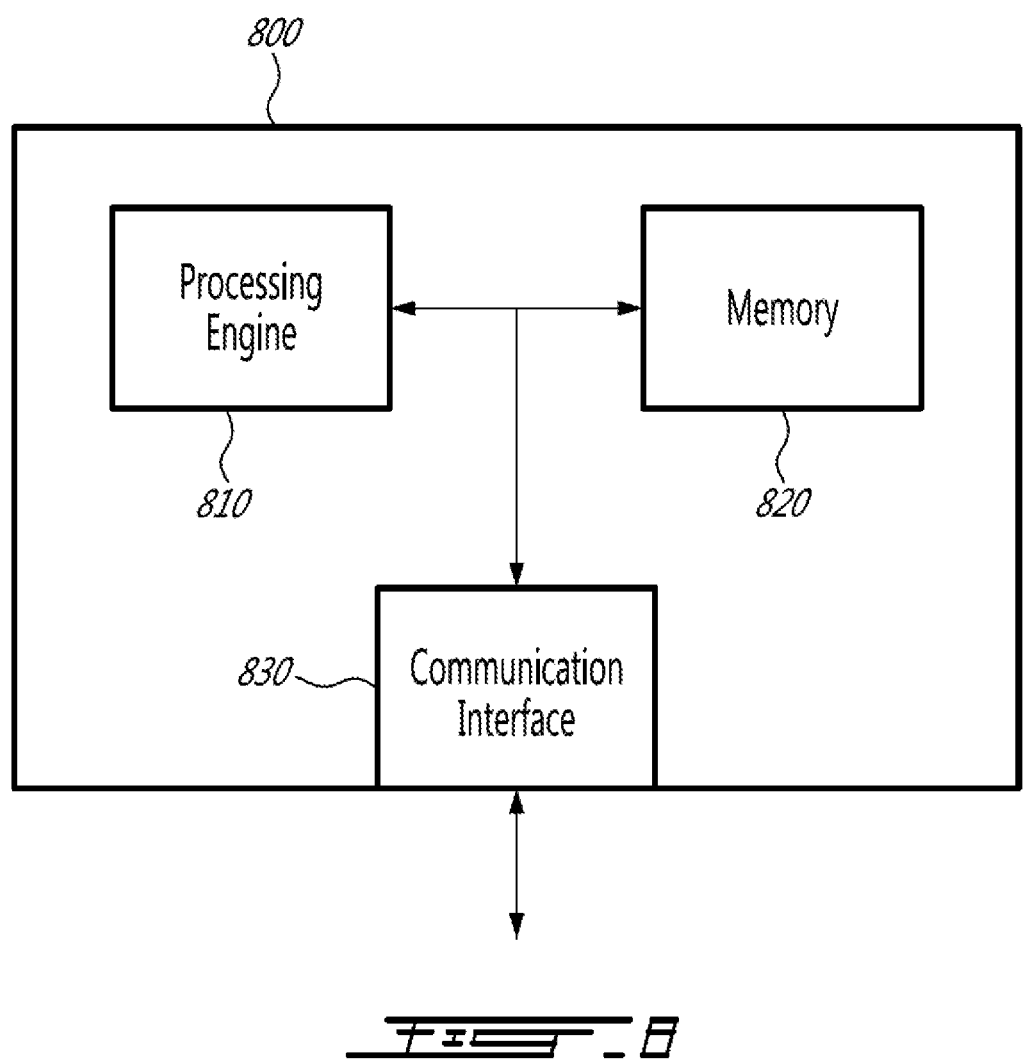

SYSTEM AND METHOD FOR MINIMIZING NETWORK LOAD IMBALANCE AND LATENCY

CROSS REFERENCE TO RELATED APPLICATIONS

This application is a continuation application of U.S. patent application Ser. No. 13/744,600 and has all priority and filing dates of the parent application.

TECHNICAL FIELD

The present invention relates generally to telecommunication network management. In particular, systems and methods for optimizing the re-homing of network elements.

BACKGROUND

With the rapid growth of the telecommunication industry, operators try to offer customers consistent high speed quality service while dealing with increased traffic demands. Long Term Evolution (LTE) networks can be subject to downgraded services, such as load imbalances between nodes and low quality of service related to handover delays, due to increased network demands as more subscribers are joining the network. In addition, these network issues may be the result of poor network topology planning and operators taking shortcuts at deployment.

In order to alleviate these issues, a first step in network planning and optimization can be to develop a re-homing plan. Generally, re-homing is a redistribution and reconfiguration process for traffic and routing in the radio domain by moving a cell site from a Radio Network Controller (RNC) with a heavy load to one with a lower load. The objective is to reconfigure the network elements in a geographic area to better load balance the network due to traffic growth and migration to achieve the optimization of routings, loading and throughput for the radio access network.

Currently these re-homing operations are performed on the fly and based on common sense, without any mathematical or automated approach. The cell site re-homing procedure for radio access networks requires many manual operation steps, so it is a labor intensive and time-consuming task requiring reconfigurations of both the radio and transport networks. This approach can lead to only a short term fix or a local optimization, given the exponential theoretical possibilities of performing the re-homes in a real-size LTE network. Any changes in routing, loading and throughput resulting from the re-homing at the radio side will undoubtedly impact the performance of core network as well. Determining an optimal re-homing plan while satisfying the various network constraints and objectives can be a challenging process.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for determining an improved network topology, the network topology defining associations between payload handling nodes in a network. Performance data is received from a plurality of payload handling nodes. The payload handling nodes can include radio stations, transport nodes and payload gateways. A current network condition is calculated in accordance with a current network topology and the received performance data. A revised network topology is determined by selecting a radio station to re-home from its associated transport node and associated payload gateway in the current network topology to a selected transport node and a selected payload gateway. A revised network condition is calculated in accordance with the revised network topology and the received performance data. The revised network topology is accepted and set as the current network topology in response to determining that the revised network condition is improved over the current network condition. The current network topology is then transmitted to the re-homed radio station.

In an embodiment of the first aspect of the present invention, the revised network topology can be accepted as the current network topology, in response to determining that the revised network condition is not improved as compared to the initial network condition, in accordance with a defined acceptance rate.

In another embodiment, the steps of determining a revised network topology, calculating a revised network condition, and accepting the revised network topology as the current network topology are iteratively repeated until a predefined end condition is satisfied. The end condition can be selected from a group consisting of: a predefined number of iterations, a predefined improvement over an initial calculated network condition, and a network condition target. The acceptance rate of accepting revised network conditions which are not improved can be defined in accordance with a number of iterations the steps have been repeated. The acceptance rate can be decreased as the number of iterations increases.

In another embodiment, the radio station is selected in accordance with a result of at least one previous iteration. The radio station can be selected in a non-random manner in accordance with a result of at least one previous iteration.

In another embodiment, re-homing instructions are transmitted to radio stations selected for re-homing in the current network topology of the final iteration as compared to an initial current network topology.

In another embodiment, the revised network topology is determined by randomly selecting a radio station for re-homing. The selected radio station can be re-homed from its associated transport node and associated payload gateway in the current network topology to a randomly selected transport node and a randomly selected payload gateway.

In another embodiment, a revised network topology resulting in an improved network condition is rejected if the revised network topology is a previously considered topology.

In a second aspect of the present invention, there is provided a network node including a processing engine, a memory and a communication interface. The communication interface receives performance data from a plurality of payload handling nodes in a network including radio stations, transport nodes and payload gateways. The processing engine is configured to execute instructions stored in the memory to calculate a current network condition in accordance with a current network topology and the received performance data. A revised network topology is determined by selecting a radio station to re-home from its associated transport node and associated payload gateway in the current network topology to a selected transport node and a selected payload gateway. The processing engine calculates a revised network condition in accordance with the revised network topology and the received performance data. The revised network topology is accepted as the current network topology in response to determining that the revised network condition is improved as compared to the current network condition. The processing engine instructs the communication interface to transmit the current network topology to the re-homed radio station.

In an embodiment of the second aspect of the present invention, the processing engine is configure to accept the revised network topology as the current network topology, in response to determining that the revised network condition is not improved as compared to the initial network condition, in accordance with a defined acceptance rate.

In another embodiment, the revised network topology is determined by randomly selecting a radio station for re-homing from its associated transport node and associated payload gateway in the current network topology to a randomly selected transport node and a randomly selected payload gateway.

In another embodiment, the processing engine is configured to reject the revised network topology resulting in an improved network condition if the revised network topology belongs to a list of previously considered topologies.

In another embodiment, the processing engine is configured to iteratively repeat the steps of determining a revised network topology, calculating a revised network condition, and accepting the revised network topology as the current network topology until a predefined end condition is satisfied. The radio station can be selected in accordance with a result of at least one previous iteration.

In another embodiment, the processing engine is configured to accept the revised network topology as the current network topology, in response to determining that the revised network condition is not improved as compared to the initial network condition, in accordance with a defined acceptance rate, the acceptance rate being defined in accordance with a number of iterations the steps have been repeated.

In another embodiment, the communication interface is configured to transmit re-homing instructions to radio stations selected for re-homing in the current network topology of a final iteration as compared to an initial current network topology.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 3A, 3B, 3C, 3D illustrate examples of handover delays and buffered data;

FIG. 7 is a flow chart illustrating at least one embodiment of the present invention; and FIG. 8 is a block diagram illustrating a network node according to at least one embodiment of the present invention.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
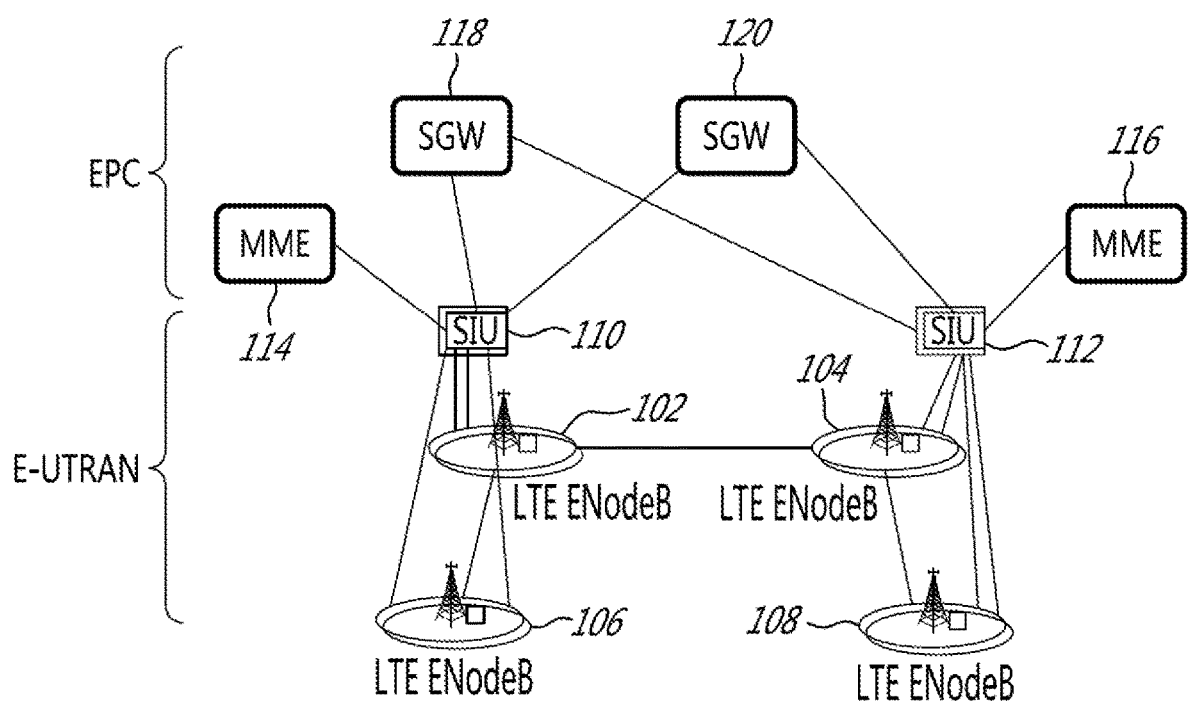
FIG. 1 is an example LTE network topology.

LTE network architecture is divided into two parts: the Evolved Packet Core (EPC) and the Evolved-Universal Terrestrial Radio Access Network (E-UTRAN). The EPC consists mainly of the Serving Gateway (SGW) and the Mobility Management Entity (MME) nodes. The E-UTRAN contains mainly the ENodeB (or NodeB) and the Site Integration Unit (SIU) nodes. FIG. 1 illustrates an example LTE network topology and the relationships between these nodes.

The LTE ENodeB nodes 102, 104, 106 and 108, (which can also be referred to as the Digital Unit LTE (DUL)) are the network components that provide the air interface to the User Equipment (UE). The ENodeB is responsible for radio transmission to and reception from UEs in one or more cells. It is connected to its neighbour ENodeBs by means of the X2 interface and to the EPC nodes (respectively SGW and MME) via the SIU for both user plane and control plane data transfer.

The SIU nodes 110 and 112 act as an interface between the EPC core transport network and one or more ENodeBs. The SIU will be referred to as the "parent" of its respective ENodeB(s), and the ENodeBs as "children" of the SIU for the purpose of this description. The SIU can be placed in central positions, strategically located to all ENodeBs connected to it, and supports the following main functions. The SIU aggregates all traffic from its ENodeB children sites to a single Wide Area Network (WAN) interface. The SIU provides site router functionality with the support of configurable static routes to forward traffic between different IP interfaces created in the system. The SIU is responsible for Quality of Service (QoS) on the WAN interface for outbound traffic. Eight queues are implemented in the SIU for the outgoing traffic in the WAN interface. Finally, the SIU has E1/T1 interfaces and Ethernet interfaces, for incoming and outgoing traffic.

The MME nodes 114 and 116 are part of the EPC core network and handle control plane messages from the E-UTRAN nodes. The MME keeps track of UEs moving around within the MME's service area. It handles Non-Access Stratum (NAS) signaling, including security (such as integrity protection and ciphering). It manages X2-based handovers (intra MME, with or without SGW re-selection) and S1-based handovers (intra or inter MME, with or without SGW re-selection).

The SGW nodes 118 and 120 are data plane gateways that manage user-plane mobility between the RAN and core networks. The SGW maintains the data path between the ENodeB and the PDN Gateway (PGW), not shown in FIG. 1. From a functional perspective, the SGW is the termination point of the packet data network interface towards E-UTRAN.

A tracking area consists of one or more cells. The size of a tracking area can range from a part of a city to an entire state or province. A tracking area can be covered by one or more MME nodes, if an MME pool is used. A UE can move between tracking areas within the MME area without having to change MME. All tracking areas served by the same MME (i.e. tracking areas that a UE can enter without initiating a Tracking Area Update (TAU) procedure) are listed in a Tracking Area Identity (TAI) list. When the UE leaves the TAI list coverage area, it has to initiate the TAU procedure.

An SGW service area is defined as an area where a UE is served without having to change SGW nodes. An SGW service area can be served by one or more SGWs in parallel. SGW service areas are a collection of complete tracking areas and SGW service areas may overlap each other.

When a UE moves within a tracking area, or between tracking areas, while there are ongoing data sessions and the RAN detects the move prior to the UE initiating a TAU procedure, the RAN initiates a handover procedure between the ENodeBs in order to avoid service interruption. Different handover scenarios can happen at X2 or S1 interfaces as will be explained. Mobility with an X2-based handover scenarios include intra-MME X2-based handover without SGW relocation and intra-MME X2-based handover with SGW relocation. Mobility with S1-based handover scenarios include intra-MME S1-based handover with SGW relocation, inter-MME S1-based handover without SGW relocation, and inter-MME S1-based handover with SGW relocation.

The X2 interface is used to inter-connect ENodeBs. It can be established between one ENodeB and some of its neighbouring ENodeBs in order to exchange signaling information when needed. Two types of information may typically need to be exchanged over X2 to drive the establishment of an X2 interface between two ENodeBs—load or interference related information, and handover related information. Handover via the X2 interface is triggered by default. The key features of the X2-handover for intra-LTE handover are as follows. The handover is directly performed between two ENodeBs. This makes the preparation phase quick. Data forwarding may be operated per bearer in order to minimize data loss. The MME is only informed at the end of the handover procedure once the handover is successful, in order to trigger the path switch. The release of resources at the source side is directly triggered from the target ENodeB.

It should be noted that the LTE network has an S1 interface which acts as the connectivity interface between the E-UTRAN and the EPC network for both CP and UP traffic. The S1-MME interface provides support for functionality such as paging, handover, UE context management, Evolved-Radio Access Bearer (E-RAB) management and transparent transport of messages between the MME and UE. The S1-U interface is the user plane interface for carrying user data traffic between the ENodeB and SGW received from the terminal.

As discussed, LTE networks can be subject to downgraded performance due to increasing in subscribers, traffic or inefficient network topologies. In particular, the downgraded performance can include SGW and/or SIU load imbalances and low QoS related to increased S1 and X2 handovers delays. The present invention is directed to a mechanism for performing ENodeB re-homes at the SGW and SIU level to load balance traffic among the SGWs and SIUs based on their capacity such that the SGW and SIU nodes are neither over-used nor under-used. ENodeB re-homes can also drastically affect X2 and S1 handover delays and buffered data.

Figure 2A:
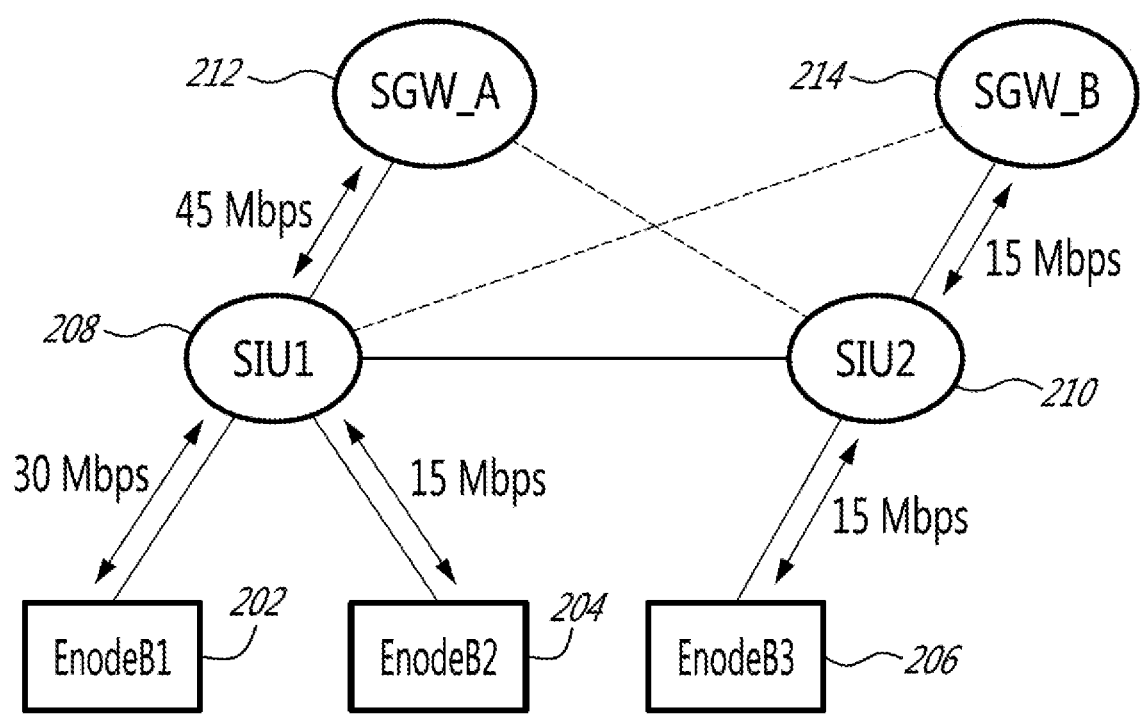
FIGS. 2A, 2B, 2C, 2D illustrate examples of load balancing.
Figure 2B:
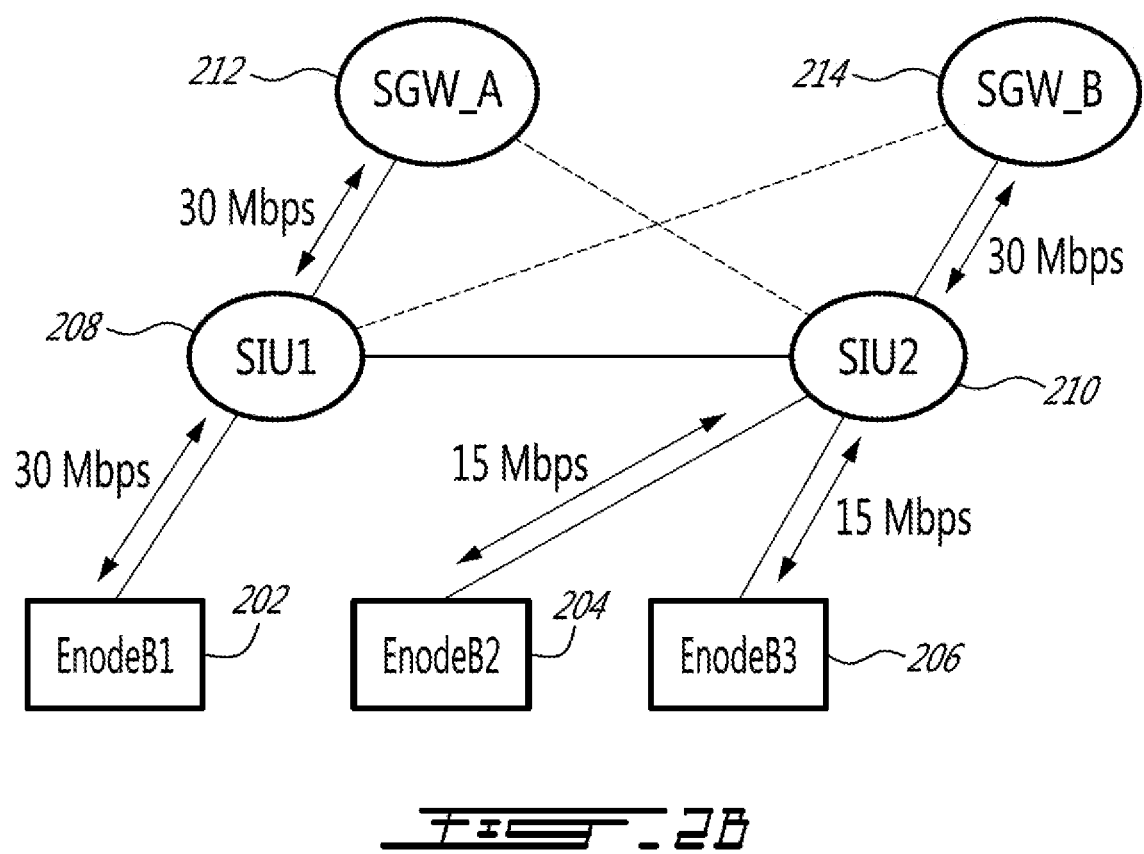

FIGS. 2A, 2B, 2C and 2D illustrate an example of load balancing among SIU and SGW nodes. In the exemplary network of FIG. 2A, SIU1 208 has ENodeB1 202 and ENodeB2 204 as its children with an aggregate traffic flow of 45 Mbps. SIU2 210 has ENodeB3 206 as its child with an aggregate traffic flow of 15 Mbps. Assuming that SIU1 208 and SIU2 210 are neighbors, it can be decide to re-home ENodeB2 204 to SIU2 210 to load balance the traffic amongst SIU1 208 and SIU2 210, both on the inner bound (links between SIUs and ENodeBs) and the outbound (links between SIUs and SGWs) of the SIUs. The resulting network following the re-home is illustrated in FIG. 2B. We can refer to this particular re-home as both a physical and a logical ENodeB re-home at the SIU level.

Figure 2C:
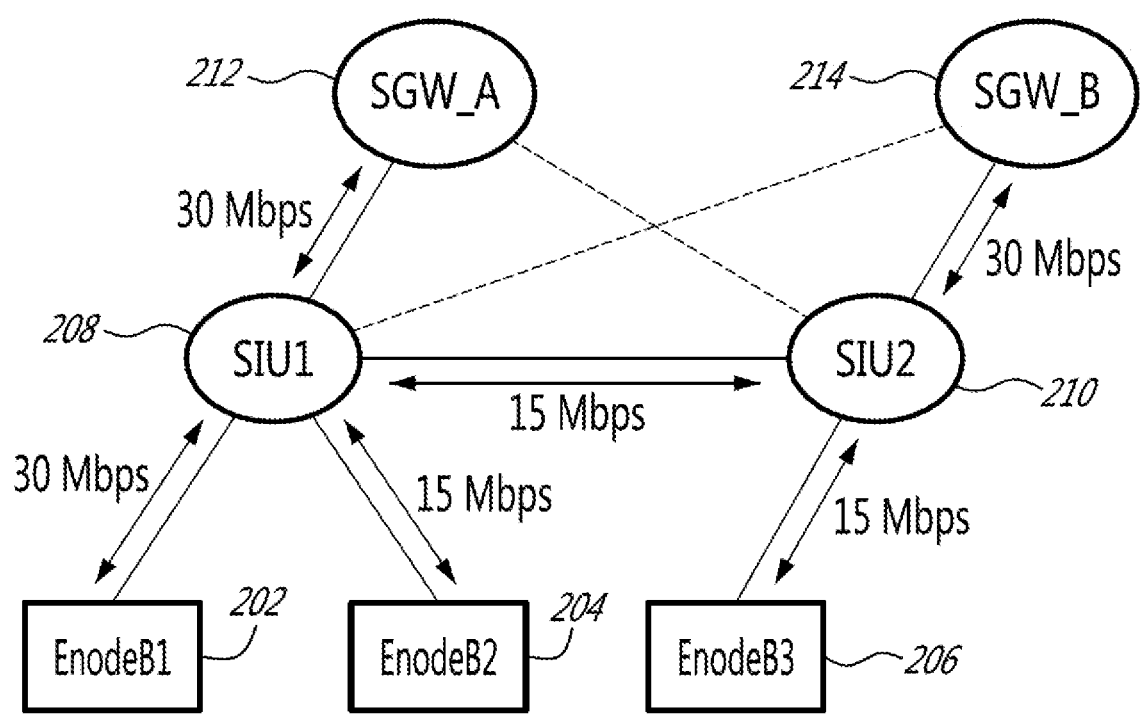

It should be noted that if a physical re-home is not possible, it may still be possible to re-home the ENodeB2 204 logically to SIU2 210. This scenario is illustrated in FIG. 2C. In this case, the traffic of ENodeB2 204 will be routed from SIU1 208 to SIU2 210 to reach SGW_B 214. Even though the traffic flow of ENodeB2 204 is still traveling via SIU1 208, load balancing can still be achieved at the outbound of the SIU (i.e. between the SIUs and the SGWs).

Figure 2D:
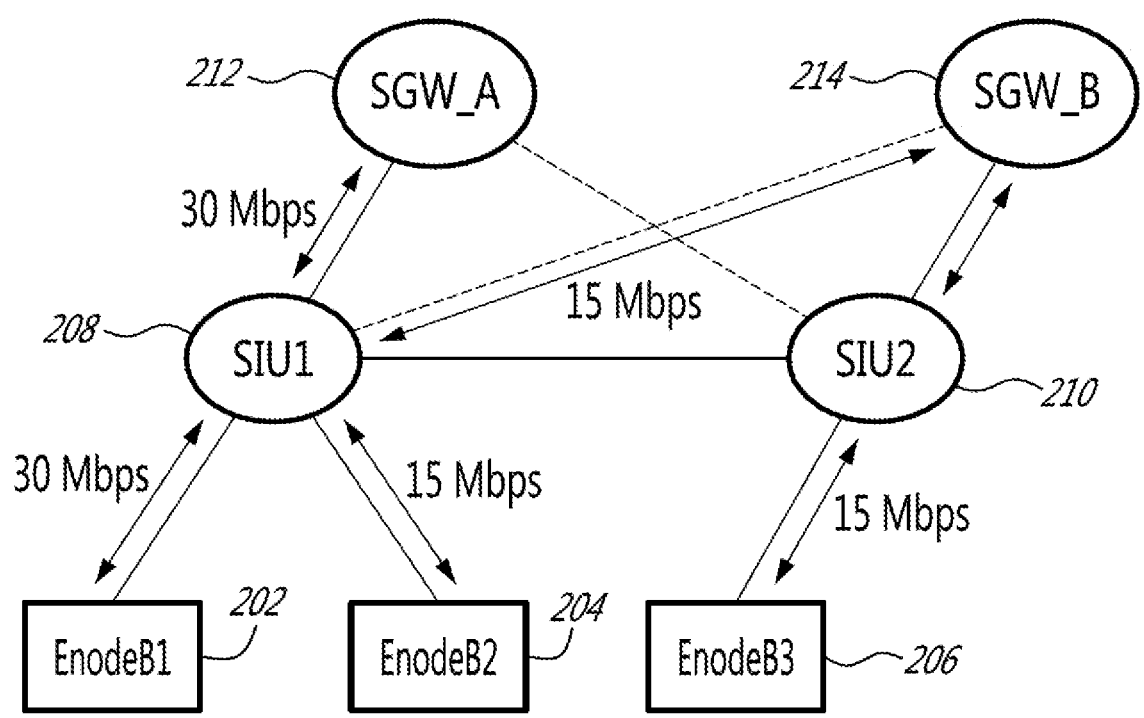

In FIG. 2D, the concept of SGW pools is introduced. ENodeB2 204 has the ability to select between SGW_A 212 and SGW_B 214 to forward/receive data packets. In such an example, it was decided that ENodeB2 204 should use SGW_B 214 to forward/receive data packets in order to load balance the traffic at the SGW level. This scenario will be referred to as an ENodeB re-home at the SGW level. It is noted that this type of re-home does not impact the SIU load imbalance as ENodeB2 204 data flow continues to transit via SIU1 208.

It will be appreciated that in this small network example, it is easy to identify the particular re-home move that will lead to optimal load balancing. However, for a large scale, real-size LTE network with hundreds of SIU and ENodeB nodes, such an identification is a much more complex operation. An exponential amount of re-homing combinations of ENodeBs to different SIUs (ENodeB re-home at the SIU level) and to different SGWs (ENodeB re-home at the SGW level) are possible.

Figure 3A:
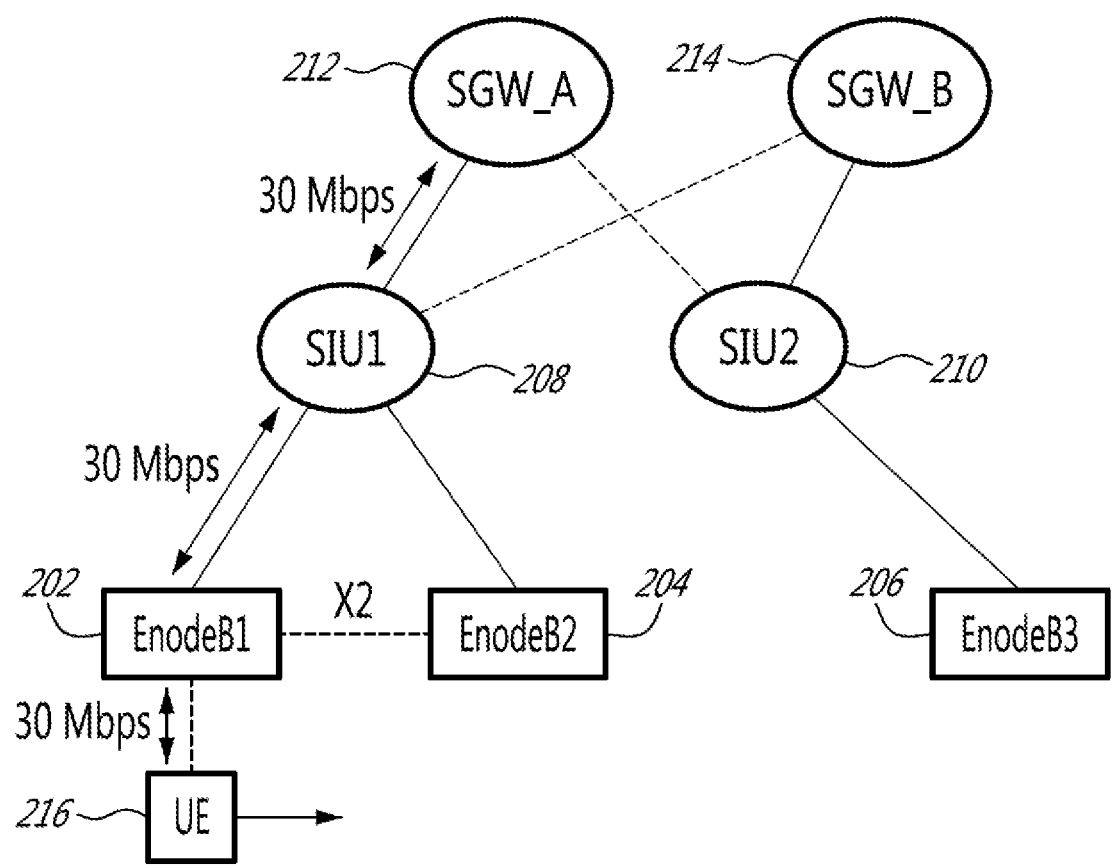
Figure 3B:
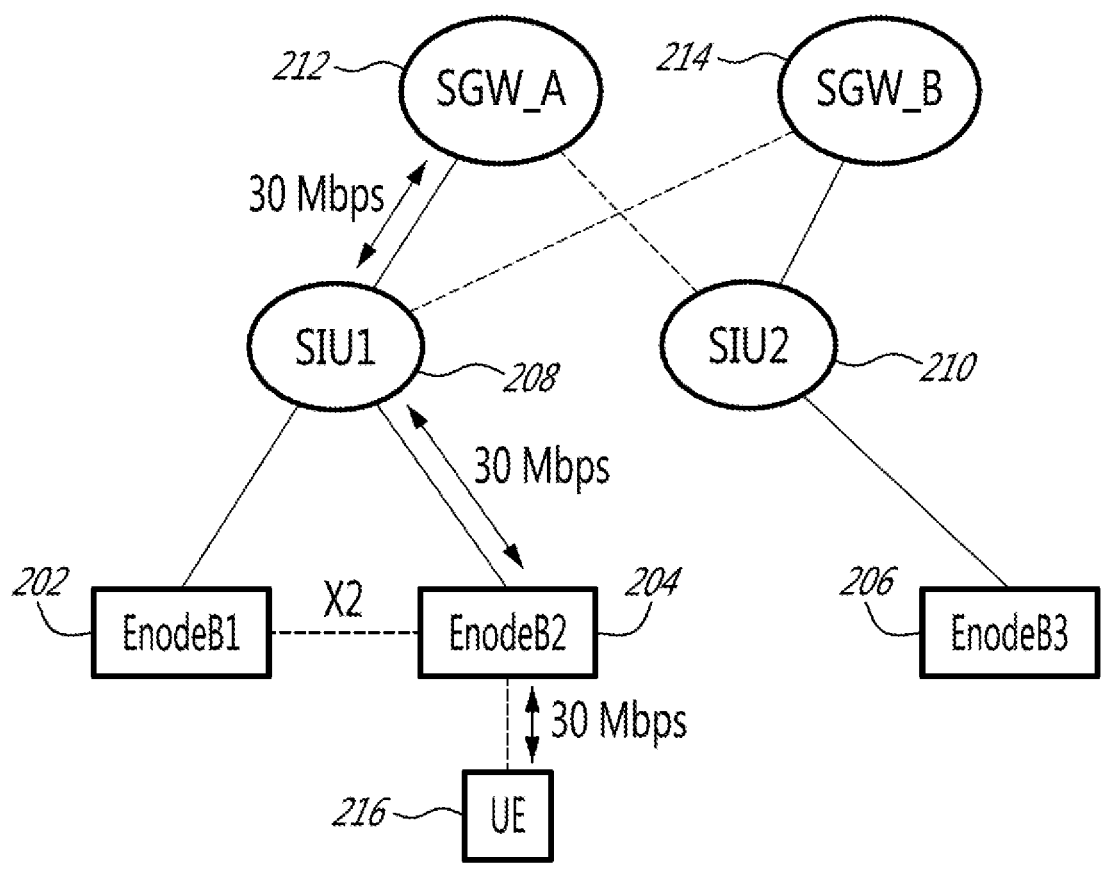

FIGS. 3A, 3B, 3C and 3D illustrate examples of the delay and buffered data issues related to handovers. In FIG. 3A, the network topology has SIU1 208 as the parent of ENodeB1 202 and ENodeB2 204, and SIU2 210 is the parent of ENodeB3 206. ENodeB1 202 and ENodeB2 204 have selected SGW_A 212 as their EPC packet forwarding entity, and ENodeB3 206 has SGW_B 214 as its EPC core entity. In this exemplary embodiment, a UE 216 is connected via ENodeB1 202 (and therefore also SIU1 208 and SGW_A 212) with a traffic flow of 30 Mbps. UE 216 proceeds with a handover to ENodeB2 204. In this case it is an X2 handover as ENodeB1 202 and ENodeB2 204 are paired with the same SGW, SGW_A 212. Assuming for this example that the X2 handover completion time is 0.5 seconds, the amount of data buffered at ENodeB2 204 will be 15 Mbits until the handover is complete. FIG. 3B illustrates the network following the completion of the handover and path re-selection between UE 216, ENodeB2 204, SIU1 and SGW_A 212.

Figure 3D:
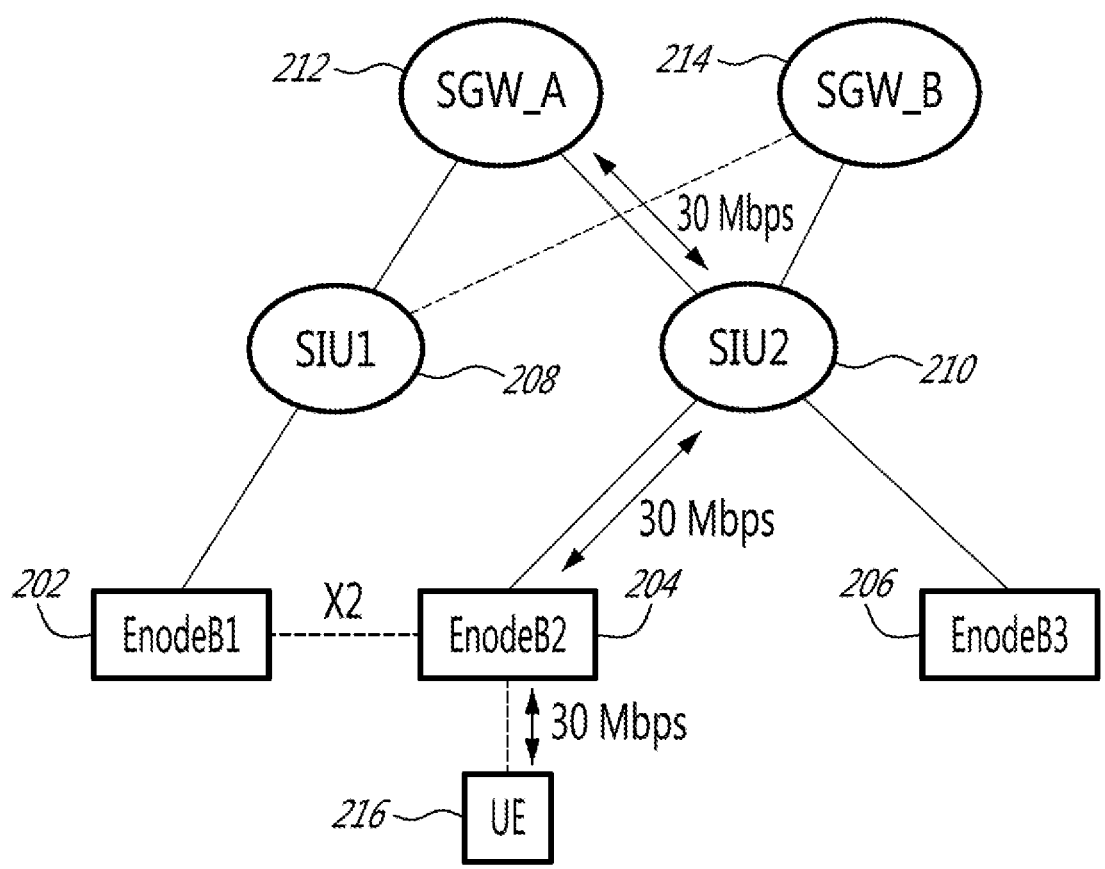

In the example of FIGS. 3C and 3D, ENodeB2 204 has been re-homed to SIU2 210. If UE 216 wants to perform a handover from ENodeB1 202 to ENodeB2 204, the handover completion time can be assumed to be greater than the 0.5 seconds of the handover from FIG. 3A to FIG. 3B, and therefore the amount of buffered data at ENodeB2 204 will be greater than 15 Mbits. The increased handover completion time is due to the fact that the initial traffic flow path was UE 216, ENodeB1 202, SIU1 208, SGW_A 212 (FIG. 3C), and after the X2 handover traffic flow path becomes UE 216, ENodeB2 204, SIU2 210, SGW_A (FIG. 3D). ENodeB2 204 and SIU2 210 differ from the initial path. As both the ENodeB and SIU nodes have changed in the handover from FIG. 3C to FIG. 3D, it will take more time to reserve the resources and establish the new path as compared with the previous scenario in FIGS. 3A and 3B. In the handover from FIG. 3A to FIG. 3B, only the ENodeB node differs from the original path.

It will appreciated by those skilled in the art that numerous types of handover scenarios are possible, even in the small example LTE network shown in FIGS. 3A-3D. In another example, not illustrated, ENodeB1 202 and ENodeB2 204 can both belong to SIU1 208, but ENodeB1 202 can select SGW_A 212 as its EPC core entity and ENodeB2 204 can select SGW_B 214. In such a case, the handover of UE 216 between ENodeB1 202 and ENodeB2 204 is no longer an X2 handover, but instead is an S1 handover. Increased signaling to establish the new path will lead to increased buffer data, even though the data packets still transit via SIU1 208. In yet another example, the ENodeBs can belong to different SIUs and different SGWs. In this scenario, the S1 handover will incur increased signaling as compared to previous scenarios, as ENodeB1 202 and ENodeB2 204 use both different SIUs and different SGWs to forward their user plane packets. The user plane path can change from UE 216, ENodeB1 202, SIU1 208, SGW_A 212 to UE 216, ENodeB2 204, SIU2 210, SGW_B 214 after handover.

From these examples it can be observed that, while ENodeB re-homes at the SIU and SGW levels can lead to a better load balancing, they can also impact the quality of service with increased X2/S1 handover delays and buffered data. Performing ENodeB re-homes is not an easy task, and cannot be done on the fly since it can impact several performance indicators. ENodeB re-homes that will achieve both optimal load balancing and reduced X2/S1 handover delays and buffered data are desired.

Figure 4:
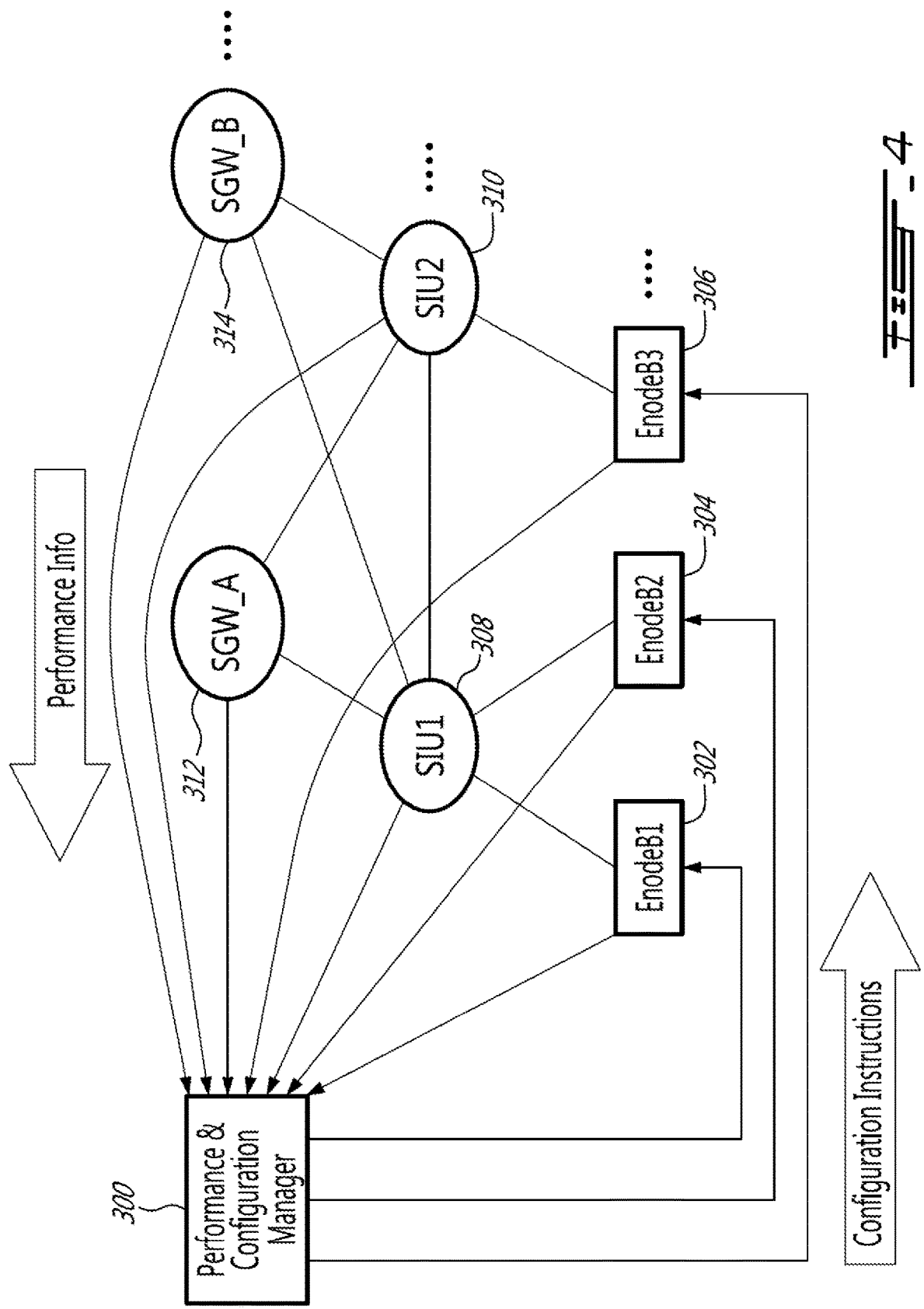
FIG. 4 is a system diagram illustrating an embodiment of the present invention.

FIG. 4 is a system diagram illustrating an embodiment of the present invention. A Performance and Configuration Manager node 300 is provided, which receives performance data and information from the payload-handling nodes in the user plane of the network and transmits configuration instructions to the radio base stations. The radio stations ENodeB1 302, ENodeB2 304, ENodeB 306 can transmit their traffic loads and X2/S1 handover latencies to the Manager 300. The transport nodes/routers SIU1 308, SIU2 310 can transmit their traffic loads to the Manager 300. The payload gateways SGW_A 312, SGW_B 314 can also transmit their traffic loads to the Manager 300. The traffic loads can include the bandwidth of current uplink and downlink traffic being handled by each node. The Manager 300 can use the received performance information to determine a set of ENodeB re-homes to minimize the load imbalance between nodes and reduce S1 and X2 handovers delays and buffered data. The Manager 300 can then transmit the new configuration to the ENodeBs that have been re-homed.

Mathematical optimization approaches can be used to efficiently explore the set of feasible ENodeB re-homes and to automatically select only those that would lead a global optimum solution. The Performance and Configuration Manager 300 can output the identified optimal ENodeB re-homes to the Operation Support System-Radio and Core (OSS-RC) so the changes to the logical topology of the network can be implemented.

A heuristic method is an optimization approach that tries to discover the global optimal feasible solution for a specific problem being considered. The heuristic method is iterative in nature. After each iteration, a feasible solution to the specific problem is identified. The problem considered is non-polynomial to solve, i.e., an exponential amount of time is required to fetch the optimal solution. When the heuristic method is terminated after an amount of time or a number of iterations, the output solution is the best solution found in any iteration.

A meta-heuristic approach is a method that provides both a generalized structure and strategy guidelines for developing a specific heuristic method to fit a particular problem. The nature of a meta-heuristic relies on orchestrating the interaction between local improvement procedures and higher level strategies to create a process that is capable of escaping from local optima and performing a robust search of a feasible region in order to converge to the global optimum. In some embodiments, concepts from commonly known meta-heuristic methods such as Simulated Annealing and Tabu Search can be used to implement the network performance optimization procedure.

In order to use these optimization approaches, a mathematical model associated with the problem to be solved needs to be defined. As previously discussed, in some embodiments, the objective can be to minimize both load imbalances and handover delays. In the following example, $C(s)$ is defined as the network objective function associated with a network configuration or state (s). This objective function can be compared to a "cost" in order to measure the total load imbalance in the network and the total handover latencies. The focus is to minimize such a cost, which will lead to increased network performances and hence better customer services. $C(s)$ can be defined as a sum of the total SGW load imbalance, the total SIU load imbalance, the total X2 handover latencies and the total S1 handover latencies. The current network condition can be calculated as $C(s)$ for the current network topology using the live traffic and performance data gathered from the payload handling nodes. Weights can be applied to each component of $C(s)$ to emphasis which component(s) of the multi-objective function has the highest priority to be minimized first. This can also be referred to as hierarchical multi-objective. The objective function can be written as:

Minimize $C(s) = \{WSGW \times (\text{Total\_SGWs\_Load\_Imbalance}(s)) + WSIU \times (\text{Total\_SIUs\_Load\_Imbalance}(s)) + WX2 \times (\text{Total\_X2\_HO\_latencies}(s)) + WS1 \times (\text{Total\_S1\_HO\_latencies}(s))\}$ where, Total_SGWs_Load_Imbalance(s)=the total load imbalance for all SGWs associated with the state (s);

Total_SIUs_Load_Imbalance(s)=the total load imbalance for all SIUs associated with the state (s);

Total_X2_HO_Latencies(s)=the total X2 handovers latencies associated with the state (s);

Total_S1_HO_Latencies(s)=the total S1 handovers latencies associated with the state (s); and WSGW, WSIU, WX2 and WS1 are weights applied to the components.

The load imbalance of a single node can be computed as the ideal capacity of the node minus the node's current bandwidth usage. For example, the Total_SGWs_Load_Imbalance parameter can be calculated as the sum of the load imbalance values for each SGW in the network. Alternatively, the load imbalance can be calculated as the maximum bandwidth of a node minus the node's current bandwidth usage, or as a comparison of bandwidths between multiple nodes.

The EnodeBs can determine the X2 and S1 handover latencies based on the number of nodes that are involved in the X2 or S1 handover establishment. This can be calculated in the control message involved during setup.

Figure 5:
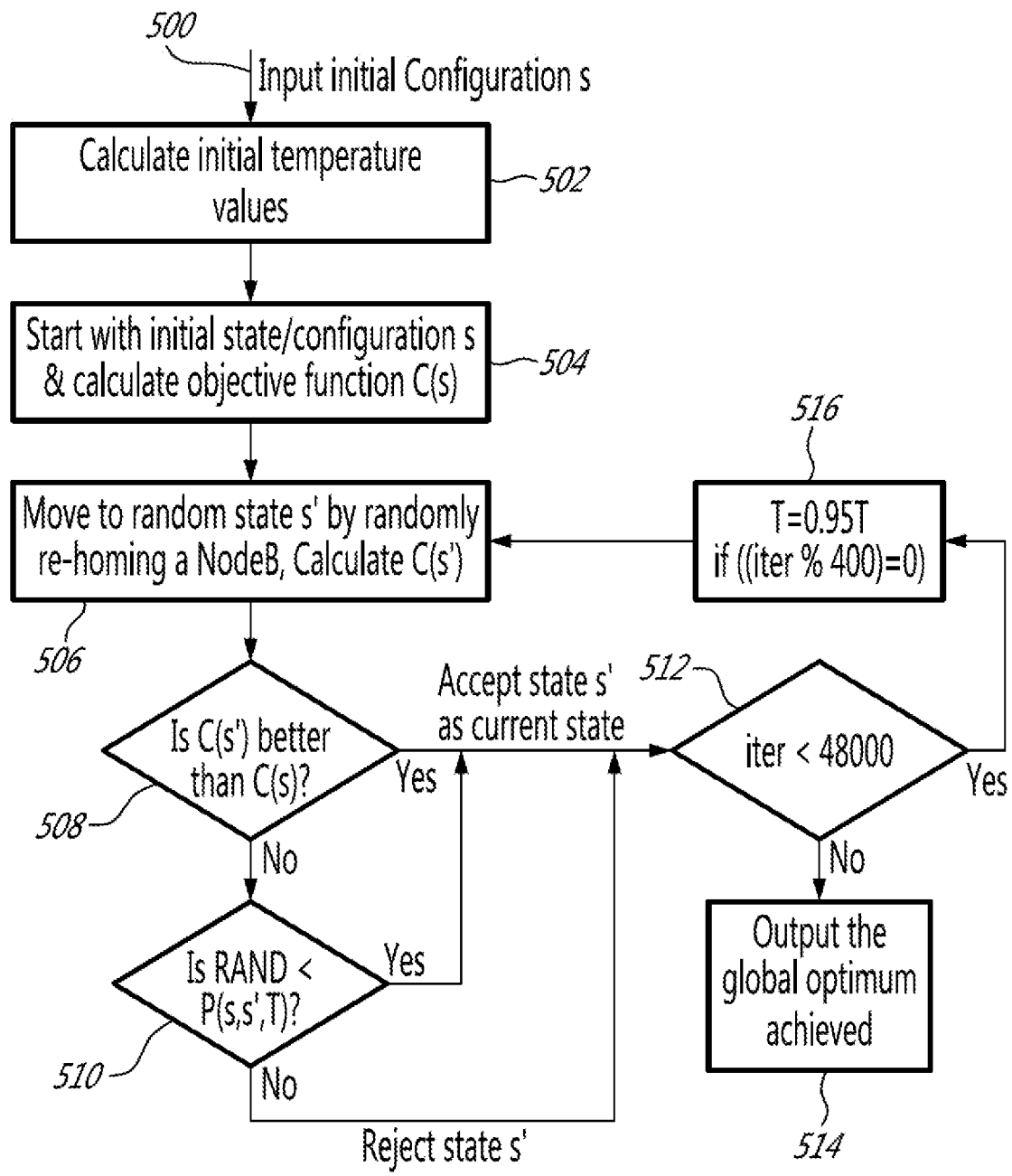
FIG. 5 illustrates a Simulated Annealing approach for improving network topology.

FIG. 5 illustrates a Simulated Annealing meta-heuristic strategy as the basic algorithm to minimize the SGW and SIU load imbalance while reducing the S1 and X2 handovers latencies. Simulated Annealing is an iterative meta-heuristic designed to escape the local optima. It will start by choosing some random directions that might downgrade the current solution, based on an acceptance probability. However, since most of its accepted random directions are upward, the Simulated Annealing will gravitate toward those parts of the feasible domain that contain the best solutions and hence leading to a global optimum solution. The search gradually emphasizes on accepting moves upward while rejecting an increasing amount of moves that will downgrade the current solution. This is done using a "temperature" parameter that decreases (i.e. the probability of accepting a downgrading solution decrease) as the Simulated Annealing iterations are increasing.

In step 500, the initial configuration, which is the customer's current LTE network configuration, is used as the input. The starting temperature values are calculated and set in step 502. The temperature parameters are used to define the percentage of re-homes that downgrade the current configuration but will be accepted. The temperature parameters can include a temperature value for each of the components of the multi-objective function (i.e. a temperature for each of SGW Load Imbalance, SIU Load Imbalance, X2 HO Latencies and S1 HO Latencies). The initial values are calculated based on the network topology and configuration provided as input. These temperatures values can then be decreased by a percentage of their current value(s) after a predetermined number of iterations. In the example of FIG. 5, the temperatures values are decreased by 5% of their value after every 400 iterations. The Simulated Annealing process of FIG. 5 is terminated after 48000 iterations. However, the total number of iterations as well as the temperature change parameters can be adjusted without departing from the scope of the invention.

In step 504, the initial network condition is calculated using the initial configuration and performance data as inputs to the objective function C(s). The initial configuration is considered to be at state (s).

In step 506, a random ENodeB is selected for re-homing from its source patent SIU and SGW to a new target parent SIU/SGW that are also selected at random. This will be referred to as a neighbouring configuration/solution or state (s'). The network condition at state (s') is calculated by applying the gathered performance data to the new (random) network configuration.

The new network condition is compared to the initial network condition in step 508 by comparing C(s) to C(s'). If state (s') is better than state (s), the random re-home is accepted and the new configuration becomes the current configuration or the next iteration configuration.

If the new configuration is not better than the initial configuration (i.e. C(s') is worse than C(s)), a percentage of downgrading new configurations are accepted in step 510. The probability of accepting or rejecting the state (s') as the next iteration network configuration is defined as P(s,s',T). The probability function can be calculated using the temperature values and a comparison of each of the components of the multi-objective function (SGW Load Imbalance, SIU Load Imbalance, X2 HO Latencies, S1 HO Latencies) at state (s) and state (s'). It will be appreciated by those skilled in the art that P(s,s',T) can be configured to favour accepting/rejecting downgrading moves with respect to certain parameters over the other parameters. "RAND", in block 510, refers to a random number between 0 and 1 which is compared to the probability function to determine if the downgrading configuration is accepted or rejected as the configuration for the next iteration.

In block 512, the total number of iterations is checked to determine if the iterative process should end. In this exemplary embodiment, following the 48,000$^{th}$ iteration, the network configuration is output for implementation in the actual LTE network in step 514.

If the predetermined number of iterations has not been met, the process moves to step 516 where the temperature values can be adjusted. As previously discussed, in this example the temperature values (T) are decreased by 5% every 400 iterations. As the Simulated Annealing process moves forwards through time, and the number of iterations increases, the temperatures parameters will decrease which will also cause P(s,s',T) to decrease. Therefore, this will lead to accepting fewer and fewer downgrading states.

Following step 516, the process returns to step 506 and will repeat until the predetermined number of iterations have been completed.

Another meta-heuristic strategy is known as Tabu Search. Similar to the Simulated Annealing approach, the Tabu Search starts with a feasible initial solution which in some embodiments is the customer's current LTE network configuration. Then from a set of potential neighboring re-homes it selects the best neighboring re-home regardless if its better or worse than the current solution's objective (as defined in the mathematical model). It then updates its "Tabu list" which is used in order to avoid cycling back to what had been the current solution. If the Tabu list becomes full, the oldest member part of this list will be removed. The stopping criterion of the Tabu Search meta-heuristic could be the number of iterations, the elapsed amount of time or a fixed number of consecutive iterations without any improvement.

In addition to the Tabu list, the Tabu Search meta-heuristic has some particular characteristics that make it a powerful strategy to converge to global optimum solution. The first characteristic to be discussed is intensification. If a viable solution is found, and a source and target SIU/SGW nodes have been identified as potential elements for improving the current solution, for several moves/iterations to come, intensification is considered to focus on only moves involving both the source and target SIU/SGW nodes. The intensification strategy is used for a subset of iterations and then random moves need to be considered again.

The second characteristic of Tabu Search to be discussed is diversification. Diversification is used to escape local optimum, where for a repetitive number of iterations no amelioration is obtained to the current network configuration. In that case, diversification is used to select moves that will focus on unexplored regions in the feasibility domain.

Concepts similar to the Tabu list, intensification and diversification strategies can be incorporated into the process described in FIG. 5 for improved performance and faster convergence to a global optimal solution.

Figure 6:
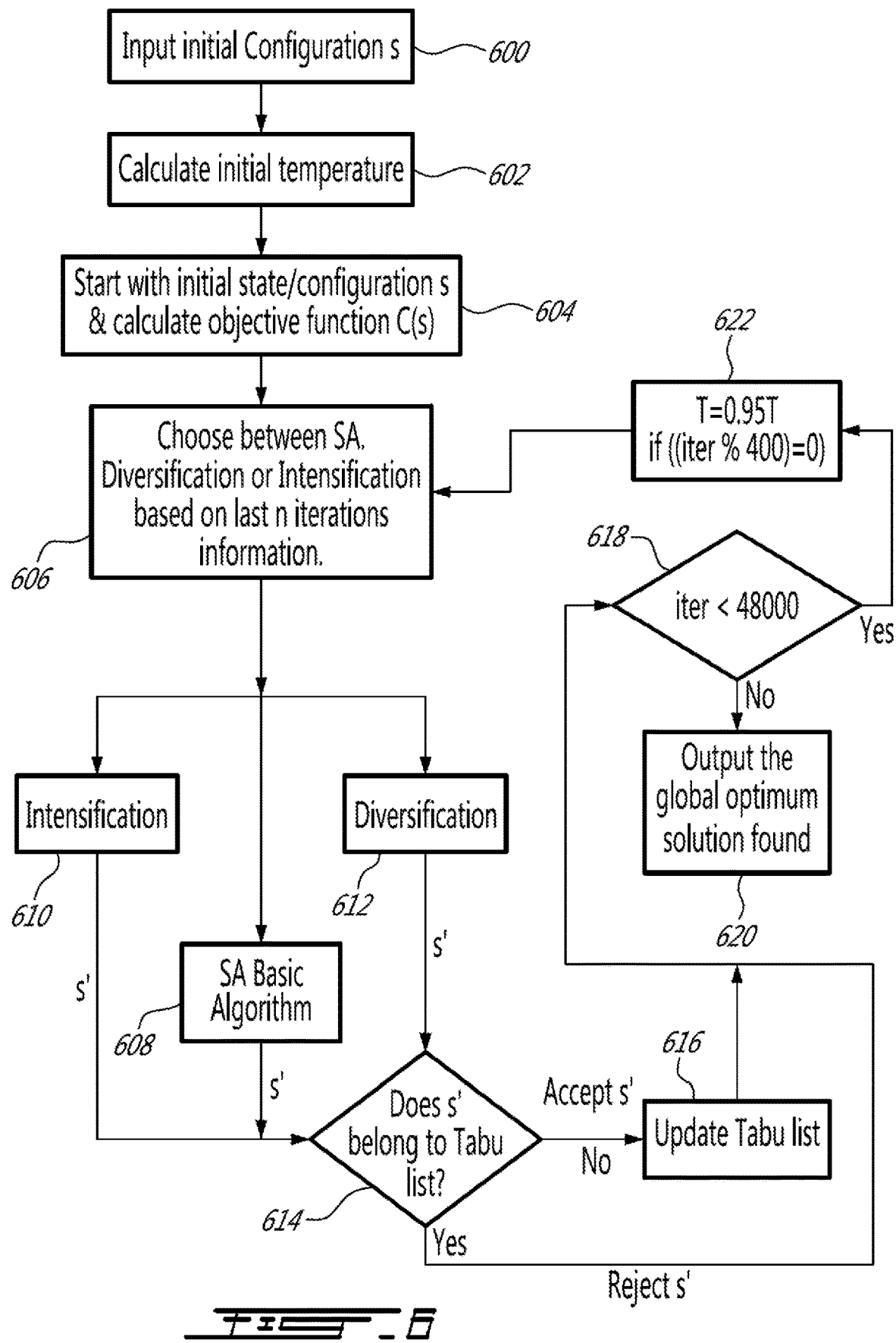
FIG. 6 illustrates a hybrid meta-heuristic approach for improving network topology.

FIG. 6 illustrates a hybrid meta-heuristic strategy for minimizing the SGW and SIU load imbalance while reducing the S1 and X2 handovers latencies. Similar to as described with respect to the embodiment of FIG. 5, in step 600, the initial network configuration is input. The starting temperature values are calculated and set in step 602. In step 604, the initial condition is calculated using the initial configuration and performance data as inputs to the objective function C(s). The initial configuration is considered to be at state (s).

In step 606, a selection of which optimization strategy to use for the present iteration is made. This selection can be made based on the results of the previous n iterations, n being an integer value that can be configured by the operator. In some embodiments, the Simulated Annealing algorithm of block 608 will always be selected for the first iteration.

Block 608 represents the Simulated Annealing basic algorithm that was described in FIG. 5 steps 506, 508, and 510. A random ENodeB is selected for re-homing to a new randomly selected SIU and/or SGW parent as random state (s'). The new network condition C(s') is calculated and compared to the previous network condition C(s). If the new condition is improved, the random re-homing is accepted and C(s') is the starting configuration for the next subsequent iteration. If the new condition is not improved, a percentage of downgrading configurations are accepted as the starting configuration for the next subsequent iteration in accordance with a temperature parameter(s).

Alternatively, based on the decision in step 606, the intensification strategy of block 610 is selected. Intensification is used to focus on re-homing moves of particular nodes. A random re-homing move involving specifically identified source and target SIU/SGW nodes is selected. The new network condition can be calculated and compared to the previous network condition to determine if the re-homing should be accepted. In an intensification iteration, typically only re-homes that improve the overall condition will be accepted, as intensification takes place when a particular node has been identified as a candidate where moves with respect to this node will only improve the overall condition in a consecutive way and for a number of moves. Once the re-homes related to this particular node have been performed, some percentage of re-homes that do not improve the overall condition can be accepted again.

The final path option, as selected in the step 606, is the diversification strategy of block 612. Diversification is used to select unexplored re-homing moves. A random re-homing move involving source and target SIU/SGW nodes that have not been previously considered is selected. The new network condition can be calculated and compared to the previous network condition to determine if the re-homing should be accepted. In a diversification iteration, re-homes that improve the overall condition will be accepted and optionally, some percentage of re-homes that do not improve the overall condition can be accepted.

After the network configuration for the next iteration, state (s'), has been selected by one of blocks 608, 610 or 612, the process proceeds to step 614 to determine if state (s') belongs to the Tabu list. If yes, the new network condition is rejected and process uses the previous state (s) as the network configuration for the next iteration.

If state (s') does not belong to the Tabu list, the new network configuration is accepted and the state (s') is added to the Tabu list in step 616 to prevent the process from returning to previously considered solutions. The oldest state stored in the Tabu list can optionally be deleted from the Tabu list in step 616.

In step 618, the total number of iterations is checked to determine if the iterative process should end. In this exemplary embodiment, following the 48,000$^{th}$ iteration, the network configuration is output for implementation in the actual LTE network in step 620.

If the predetermined number of iterations has not been met, the process moves to step 622 where the temperature values can be decreased, similar to as was described with reference to step 516 in FIG. 5.

Following step 622, the process returns to step 606 to select which of strategies 608, 610 or 612 to use for the subsequent iteration. This process repeats until the predetermined number of iterations have been completed.

FIG. 7 is a flow chart illustrating a method for determining an improved network topology according to at least one embodiment of the present invention. The method can be performed by a performance and configuration management entity residing in the network. The method begins in step 700 by receiving performance data from payload handling nodes in the network. The payload handling nodes can include radio stations, transport nodes and payload gateways. In an exemplary LTE network, this can include the ENodeB, SIU and SGW nodes. A network topology defines the associations between these payload handling nodes in the network. The associations between the payload handling nodes can include the payload-forwarding path relationship between the nodes. For example, the association between a radio station and its parent transport node and payload gateway can be defined by the topology.

The received performance data can include a number of parameters including the traffic load being handled by each node, port number utilization, CPU usage, and handover latency information. In the exemplary LTE network, the SIU and SGW nodes can transmit their traffics loads while the ENodeBs can transmit the X2 and S1 handover latencies.

The current network condition is calculated in step 710 in accordance with the current network topology and the received performance data. The network condition can be a value representing the overall network performance with respect to certain parameters or criteria. The network condition can be calculated by summing each parameter as reported by the payload handling nodes. Different weights can be applied to the different parameters to focus the network improvement on a particular aspect. In the LTE network example, the load imbalance values as reported by each SIU node can be summed together to calculate a total network SIU load imbalance number. Similarly, the X2 handover latency values as reported by each ENodeB can be summed together to calculate a total network X2 handover latency value. When calculating the network condition, balancing the loads between SIUs may be given more importance than the other network parameters. Therefore, the weight applied to the SIU load imbalance value would be greater than the weight applied to the X2 handover latency value when calculating the network condition, in this example. The mathematical formula to calculate the network condition can be set up to obtain the objective of the network operator, and that objective can be manipulated by the weights applied to each parameter that is considered.

In step 720, a revised network topology is determined by selecting a radio station to re-home from its associated transport node and associated payload gateway in the current network topology to a new transport node and a new payload gateway. The radio station can be randomly selected for re-homing. The target new transport node and/or new payload gateway can also be selected at random.

The revised network condition is calculated in step 730, in accordance with the revised network topology and the received performance data. The revised network condition can be calculated similar to as described with respect to step

710. However, the received performance data parameters will be applied to revised topology that includes the re-homed radio station.

In step 740, the revised network condition is compared to the current network condition in order to determine if the network condition is improved or degraded by changing the network topology from the current topology to the revised topology.

If the revised network condition is improved with respect to the current network condition, the radio station re-homing of step 720 is accepted and the revised network topology is set as the current network topology, in step 750. Optionally, in step 760, if the revised network condition is not improved (i.e. degraded), the re-homing of step 720 can be accepted in accordance with a defined acceptance rate. A certain percentage of revised network topologies that do not improve the network condition can be accepted and set as the current network topology.

Optionally in step 770, the steps described in blocks 720, 730, 740, 750 and optionally 760 can be repeated for a number of iterations until a predefined end condition is satisfied. In other words, subsequent revised network topologies can be determined by selecting further radio stations for re-homing from their associated transport nodes and associated payload gateways to newly selected transport nodes and payload gateways. Each iterative revised network condition can be calculated and compared to the current network condition, and an improved condition can be used as the basis for accepting the revised network topology as the current network topology. Optionally, some iterations of revised network topologies that do not improve the network condition can be accepted at a defined acceptance rate.

The acceptance rate of step 760 can be defined in accordance with the number of iterations of the process. The acceptance rate can be decreased as the number of iterations increases. Alternatively, the acceptance rate can be varied in accordance with the amount of improvement (or downgrading) of the network condition from iteration to iteration.

The end condition of step 770 can be set as a predefined number of iterations, a network performance target, or a certain percentage improvement over the initially calculated network condition.

In step 780, the current network topology is transmitted to the re-homed radio station. In the iterative approach, any radio station that has been selected for re-homing in the final accepted revised network topology can be sent configuration instructions so that the network topology can be implemented by the payload handling nodes.

In alternative embodiments, the radio station selected for re-homing in step 720 can be selected in a non-random manner. The radio station can be selected in accordance with the results of a previous iteration and a number of previous iterations. For example, if the revised network topology of the previous iteration resulted in a significantly improved network condition as compared to the pervious network condition, the radio station selected in the previous iteration can be selected again for re-homing. In another alternative embodiment, if the revised network topologies of a number of previous iterations have resulted in little to no improvement in the network condition, the radio station for re-homing can be selected in a non-random manner to move the revised network topology to an unexplored topology. In yet another alternative, a revised network topology resulting in an improved network condition can be rejected if it belongs to a list of already considered topologies.

FIG. 8 is a block diagram illustrating functional details associated with a network node or device 800 capable of executing the various embodiments as described herein. The node 800 can be a performance and configuration manager as shown in FIG. 3, or can be included in an OSS-RC node in a network. The node 800 can include a processing engine 810, a memory 820 and a communication interface 830. The node 800 can be implemented using dedicated underlying hardware or, alternatively, can be implemented as a virtual machine. The node 800 can perform the various embodiments, as described herein, related to determining an improved network topology. The node 800 can perform these operations in response to a processing engine 810 executing instructions stored in a data repository such as memory 820. The instructions can be software instructions and the data repository can be any logical or physical computer-readable medium. The node 800, though shown in FIG. 8 as a single entity, can be implemented by a number of different devices that are geographically distributed.

The communication interface 830 can transmit and receive information to and from other nodes in the network. The communication interface 830 receives performance data from a plurality of payload handling nodes in a network including radio stations, transport nodes and payload gateways.

The processing engine 810 calculates a current network condition in accordance with a current network topology, which defines associations between the payload handling nodes, and the received performance data. The processing engine determines a revised network topology by selecting a radio station to re-home from its associated transport node and its associated payload gateway in the current network topology to a newly selected transport node and payload gateway in the revised network topology.

The processing engine calculates a revised network condition in accordance with the revised network topology and the received performance data. The calculated current and revised network conditions can be stored in the memory 820. The current network topology and the revised network topology can also be stored in the memory 820.

The processing engine 810 can compare the revised network condition to the current network condition. The processing engine accepts the revised network topology as the current network topology in response to determining that the revised network condition is improved with respect to the current network condition. If accepted, the revised network topology can be stored in the memory 820 as the current network topology.

Optionally, the processing engine 810 can accept the revised network topology as the current network topology in response to determining that the revised network condition is not improved with respect to the initial network condition, in accordance with a defined acceptance rate. Optionally, the processing engine 810 can reject a revised network topology resulting in an improved network condition if the revised network topology belongs to a list of previously considered topologies stored in the memory 820.

Optionally, the processing engine 810 can execute the operations described above in an iterative fashion by determining a sequence of revised network conditions and accepting those that improve the network condition. The process can repeat until the processing engine determines that an end condition has been satisfied. The radio station selected for re-homing in each iteration can be randomly selected for re-homing or, alternatively, can be selected in accordance with the result of at least one previous iteration. The selected radio station can be re-homed from its associated transport node and associated payload gateway in the current network topology to a randomly selected transport node and a randomly selected payload gateway.

The processing engine 810 instructs the communication interface 830 to transmit the current network topology to the re-homed radio station. The communication interface 830 can be configured to transmit re-homing instructions to only the radio stations which have been re-homed in the current network topology of the final iteration of the process as compared to the initial current network topology.

The system and methods described herein provide a tool for obtaining an optimized network configuration which can be output to any affected nodes so that the configuration can be implemented in the actual network. In some embodiments, once the optimized configuration of the network has been generated, the identified re-homing moves can be provided to the OSS-RC so the changes can be performed automatically. OSS-RC is responsible for several functionalities in the telecom network such as performance management, configuration management and fault management. With all of this information provided by the network, OSS-RC can have a full understating of different nodes CPU utilization, overload, and network congestion. The OSS-RC can consider this information to calculate the weight values that would be used in calculating the network condition. OSS-RC can set higher weights for the parameters that have the most impact at the network level.

By improving the network condition, increased network performance will be achieved, including better usage of network resources and better QoS where less delayed connections and buffered data are present. Better usage of the network can be achieved by load balancing of the SGW and SIU nodes where neither becomes underused or overused. This can extend the network lifetime before degraded performance is observed which might lead to adding more elements to the network, such as new SIUs. Higher QoS can be realized by carefully handling S1 and X2 handovers such that their respective latencies are reduced.

Embodiments of the invention may be represented as a software product stored in a machine-readable medium (also referred to as a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for modifying a network topology, the network topology defining payload handling associations between network nodes, the method comprising:
   receiving performance data including traffic load information from a plurality of payload handling nodes, the payload handling nodes including radio stations, transport nodes and payload gateways;
   calculating a current total load imbalance and a current total handover latency for the plurality of payload handling nodes in accordance with a current network topology and the received performance data, the calculating the current total load imbalance including comparing the bandwidths between the plurality of payload handling nodes;
   iteratively, generating a modified network topology by selecting a radio station to re-home from its associated transport node and associated payload gateway in the current network topology to at least one of a newly selected transport node and a newly selected payload gateway; calculating a revised total load imbalance and a revised total handover latency in accordance with the received performance data and the modified network topology; and responsive to determining that the revised total load imbalance between the plurality of payload handling nodes and the revised total handover latency is minimized as compared to the current total load imbalance and the current total handover latency, setting the modified network topology as the current network topology for a next iteration;
   accepting the modified network topology as a final network topology in response to a predefined end condition; and
   transmitting the final network topology to at least one re-homed radio station for implementation.

2. The method of claim 1, wherein the radio station to be re-homed is selected randomly.

3. The method of claim 1, wherein the radio station to be re-homed is selected in accordance with a result of at least one previous iteration.

4. The method of claim 1, wherein the selected radio station is re-homed from its associated transport node and associated payload gateway in the current network topology to at least one of a selected transport node and a selected payload gateway.

5. The method of claim 1, wherein the modified network topology resulting in a minimized total load imbalance and total handover latency is rejected if the modified network topology is a previously considered topology from a previous iteration.

6. The method of claim 1, further comprising, setting the modified network topology as the current network topology for the next iteration, in response to determining that the modified network condition is not minimized as compared to the current network condition, in accordance with an acceptance rate.

7. The method of claim 6, wherein the acceptance rate is defined in accordance with a number of iterations that have been repeated.

8. The method of claim 7, wherein the acceptance rate is decreased as the number of iterations increases.

9. The method of claim 1, further comprising, setting the revised total load imbalance and the revised total handover latency as the current total load imbalance and the current total handover latency for the next iteration.

10. The method of claim 1, wherein the end condition is selected from a group consisting of: a predefined number of iterations, a predefined improvement over an initial calculated total load imbalance and total handover latency, and a total load imbalance and total handover latency target.

11. A network manager node comprising circuitry including a processor and a memory, the memory containing instructions executable by the processor whereby the network manager node is operative to:
receive performance data including traffic load information from a plurality of payload handling nodes, the payload handling nodes including radio stations, transport nodes and payload gateways;
calculate a current total load imbalance and a current total handover latency for the plurality of payload handling nodes in accordance with a current network topology and the received performance data, the calculating the current total load imbalance including comparing the bandwidths between the plurality of payload handling nodes;
iteratively, generate a modified network topology by selecting a radio station to re-home from its associated transport node and associated payload gateway in the current network topology to at least one of a newly selected transport node and a newly selected payload gateway; calculate a revised total load imbalance and a revised total handover latency in accordance with the received performance data and the modified network topology; and responsive to determining that the revised total load imbalance between the plurality of payload handling nodes and the revised total handover latency is minimized as compared to the current total load imbalance and the current total handover latency, set the modified network topology as the current network topology for a next iteration;
accept the modified network topology as a final network topology in response to a predefined end condition; and
transmit the final network topology to at least one re-homed radio station for implementation.

12. The network manager node of claim 11, wherein the radio station to be re-homed is selected randomly.

13. The network manager node of claim 11, wherein the radio station to be re-homed is selected in accordance with a result of at least one previous iteration.

14. The network manager node of claim 11, wherein the selected radio station is re-homed from its associated transport node and associated payload gateway in the current network topology to at least one of a selected transport node and a selected payload gateway.

15. The network manager node of claim 11, wherein the modified network topology resulting in a minimized total load imbalance and total handover latency is rejected if the modified network topology is a previously considered topology from a previous iteration.

16. The network manager node of claim 11, further operative to, set the modified network topology as the current network topology for the next iteration, in response to determining that the modified network condition is not minimized as compared to the current network condition, in accordance with an acceptance rate.

17. The network manager node of claim 16, wherein the acceptance rate is defined in accordance with a number of iterations that have been repeated.

18. The network manager node of claim 17, wherein the acceptance rate is decreased as the number of iterations increases.

19. The network manager node of claim 11, further operative to, set the revised total load imbalance and the revised total handover latency as the current total load imbalance and the current total handover latency for the next iteration.

20. The network manager node of claim 11, wherein the end condition is selected from a group consisting of: a predefined number of iterations, a predefined improvement over an initial calculated total load imbalance and total handover latency, and a total load imbalance and total handover latency target.

* * * * *